United States Patent
Li et al.

(10) Patent No.: US 11,119,371 B2
(45) Date of Patent: Sep. 14, 2021

(54) PIXEL STRUCTURE AND DISPLAY PANEL CONTAINING SAME

(71) Applicant: SHENZHEN CHINA STAR OPTOELECTRONICS TECHNOLOGY CO., LTD., Shenzhen (CN)

(72) Inventors: Hui Li, Shenzhen (CN); Mengyang Liu, Shenzhen (CN)

(*) Notice: Subject to any disclaimer, the term of this patent is extended or adjusted under 35 U.S.C. 154(b) by 257 days.

(21) Appl. No.: 16/349,267

(22) PCT Filed: Apr. 23, 2019

(86) PCT No.: PCT/CN2019/083778
§ 371 (c)(1),
(2) Date: May 12, 2019

(87) PCT Pub. No.: WO2020/147215
PCT Pub. Date: Jul. 23, 2020

(65) Prior Publication Data
US 2021/0191204 A1  Jun. 24, 2021

(30) Foreign Application Priority Data
Jan. 15, 2019 (CN) .......................... 201910037284.4

(51) Int. Cl.
*G02F 1/1362* (2006.01)
*G02F 1/1368* (2006.01)

(52) U.S. Cl.
CPC ...... *G02F 1/136245* (2021.01); *G02F 1/1368* (2013.01)

(58) Field of Classification Search
CPC .................................................. G02F 1/136245
See application file for complete search history.

(56) References Cited

U.S. PATENT DOCUMENTS

| | | | |
|---|---|---|---|
| 2011/0157537 | A1 | 6/2011 | Chen et al. |
| 2014/0175434 | A1 | 6/2014 | Yuan |
| 2015/0286102 | A1 | 10/2015 | Lo et al. |
| 2017/0153508 | A1 | 6/2017 | Huang et al. |
| 2018/0096663 | A1* | 4/2018 | Xu .......................... G09G 3/36 |
| 2018/0294281 | A1 | 10/2018 | Gan |

FOREIGN PATENT DOCUMENTS

| | | | | |
|---|---|---|---|---|
| CN | 103022150 | A | 4/2013 | |
| CN | 103676389 | A | 3/2014 | |
| CN | 104865766 | * | 8/2015 | ........... G02F 1/1337 |
| CN | 104865766 | A | 8/2015 | |
| CN | 105470269 | * | 4/2016 | ........... G02F 1/1343 |

* cited by examiner

*Primary Examiner* — Sang V Nguyen

(57) ABSTRACT

The present invention relates to a pixel structure and a display panel containing the same. The pixel structure includes a main area and a sub-area respectively provided with four domains, wherein the main area is located above the sub-area, and the main area and the sub-area are respectively connected with driving thin-film transistors (TFTs) for current charging; wherein a quantity of the driving thin-film transistors (TFTs) connected to the main area is greater than a quantity of the driving TFTs connected to the sub-area, such that a voltage of the main area is greater than a voltage of the sub-area. The invention provides a pixel structure which adopts a novel design of an 8-domain structure, which improves an aperture ratio thereof, thereby reducing the risk of becoming a bright spot.

10 Claims, 1 Drawing Sheet

PIXEL STRUCTURE AND DISPLAY PANEL CONTAINING SAME

BACKGROUND OF INVENTION

Field of Invention

The present invention relates to the field of light-emitting display technology, and in particular, to a pixel structure and a display panel containing the same.

Description of Prior Art

It is known that liquid crystal panels, particularly large-sized liquid crystal panels, may exhibit a color shift when viewed from a wide viewing angle, and the wider the viewing angle, the more severe the color shift.

In this regard, in order to increase display viewing angles of the display panel while reducing the color shift, a large-sized display panel is generally designed to have a low color shift design in industry. For example, one common solution is to increase a quantity of domains of a pixel. Conventionally, a pixel is usually divided into four domains, and if one pixel is divided into two areas, a main area and a sub-area, each of the areas consisting of 4 domains at the same time, so that one pixel has 8 domains, which can enlarge the viewing angles and improve the color shift.

As shown in FIG. 1, which illustrates a common pixel structure in which the pixel is divided into two areas: a main area 10' and a sub-area 20', and each of the areas is provided with four domains, thereby realizing an 8-domain design. As shown in FIG. 1, the main area 10' and the sub-area 20' of the pixel are charged by a laterally disposed thin-film transistor (TFT) 30', and charging currents of the main area 10' and the sub-area 20' are identical. Accordingly, voltages of the main area 10' and the sub-area 20' are also identical.

In order to realize an 8-domain structure, it is necessary to set a voltage relationship between the main area 10' and the sub-area 20' as the main area voltage greater than the sub-area voltage, and the voltage is generally reduced by reducing the currents. In this regard, a step-down capacitor (C down capacitor) is disposed under the sub-area 20' in industry to store a portion of the charging current of the sub-area 20', thereby reducing the voltage of the sub-area 20', such that the voltage of the main area 10' is greater than the voltage of the sub-area 20'.

However, because the step-down capacitor is added to the pixel structure, design of such a structure has a low aperture ratio due to the increased quantity of components, and the risk of becoming a bright spot is high. Therefore, it is indeed necessary to develop a novel 8-domain pixel structure to overcome the drawbacks of the prior art.

SUMMARY OF INVENTION

An aspect of the present invention is to provide a novel pixel structure that employs a novel design of 8-domain structure that increases its aperture ratio, thereby reducing its risk of becoming a bright spot.

Technical solutions adopted by the present invention are as follows:

A pixel structure comprises a main area and a sub-area, each provided with four domains, wherein the main area is located over the sub-area, and the main area and the sub-area are respectively connected with driving thin-film transistors (TFTs) for current charging.

A quantity of the driving thin-film transistors (TFTs) connected to the main area is greater than a quantity of the driving TFTs connected to the sub-area, such that a voltage of the main area is greater than a voltage of the sub-area.

Further, in other embodiments, the quantity of the driving TFTs connected to the main area is at least one greater than the quantity of the driving TFTs connected to the sub-area.

Further, in other embodiments, the main area is connected to two of the driving TFTs.

Further, in other embodiments, the driving TFTs connected to the main area are adjacent to each other and arranged in parallel with each other.

Further, in other embodiments, the driving TFTs connected to the main area and the driving TFTs connected to the sub-area are arranged in parallel with each other.

Further, in other embodiments, the sub-area is connected to one driving TFT.

Further, in other embodiments, the driving TFTs connected to the main area are vertically disposed. That is, an opening of a first driving thin-film transistor (TFT) faces to the main area.

Further, in other embodiments, the driving TFTs connected to the sub-area are vertically disposed. That is, an opening of a second driving thin-film transistor (TFT) faces to the sub-area.

Further, the present invention also provides a display panel, including a substrate, wherein the substrate is provided with the pixel structure in the present invention.

Compared with the prior art, the present invention has the beneficial effects that the present invention relates to a pixel structure and a display panel thereof, wherein the pixel structure adopts a novel driving TFT arrangement for the main area and the sub-area, which specifically sets a quantity of the driving TFTs connected to the main area being greater than a quantity of the driving TFTs connected to the sub-area, so that a voltage obtained by the main area is greater than a voltage of the sub-area, and thus, a step-down capacitor that must be disposed to reduce the voltage of the sub-area due to the identical voltage of the main area and the sub-area in the prior art is no longer needed. Accordingly, the structure of the pixel is simplified, and because an additional step-down capacitor is not necessary in the pixel structure, the aperture ratio of the pixel structure is increased, thereby reducing the risk that the pixel structure becomes a bright spot.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Figure 1:
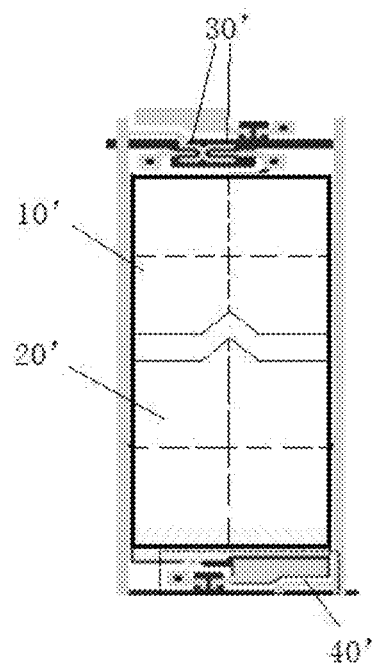
FIG. 1 is a schematic diagram of a pixel structure in the prior art.

Elements in FIGS. 1-2 s are designated by reference numerals listed below:
Main area 10, 10'
Sub-area 20, 20'
Driving thin-film transistor (TFT) 31, 32, 30'
Step-down capacitor 40'

DETAILED DESCRIPTION OF PREFERRED EMBODIMENTS

Technical solutions of a pixel structure and a display panel thereof according to the present invention will be further described in detail below with reference to the accompanying drawings and embodiments.

The present invention provides a pixel structure comprising a main area and a sub-area each provided with four domains, wherein the main area is located above of the sub-area.

A charging current formula known in the art is shown below.

$$I_d = \frac{1}{2}\mu\, C_i \frac{W}{L}(V_g - V_{th})^2$$

It can be understood, that a magnitude of the charging current of the main area and the sub-area is related to width W and length L of a channel of driving thin-film transistors (TFTs). If the length L of the channel can be decreased or the width W of the channel can be increased, it is apparent that a current value is increased, thereby increasing a voltage value, such that a voltage of the main area is greater than a voltage of the sub-area, and an 8-domain structure of the pixel structure can be realized.

Figure 2:
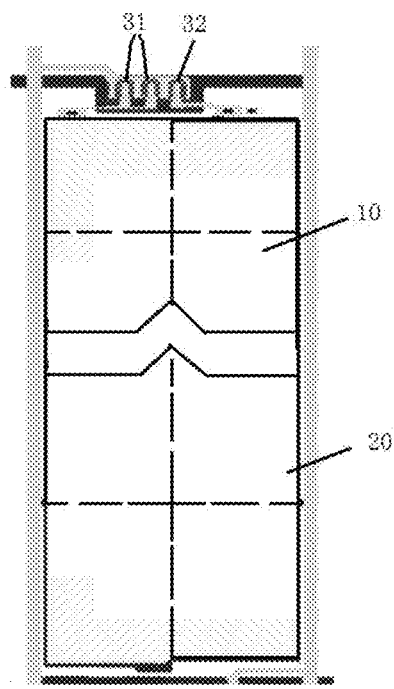
FIG. 2 is a schematic diagram of a pixel structure according to an embodiment of the present invention.

Referring to FIG. 2, which is an embodiment of the present invention introduces a novel vertically disposed driving TFT structure. Specifically, the main area 10 is connected with two vertically disposed driving thin-film transistors (TFTs) for current charging, and the sub-area 20 is connected with one vertically disposed driving TFT 32 for current charging. The three driving TFTs are adjacent to each other and arranged in parallel with each other.

In the two driving TFTs 31 of the main area 10, because the two driving TFTs are vertically disposed adjacent to each other, the width W of the channel thereof is a total of the widths of the channels of the two driving TFTs, and compared to the width W of one driving TFT, the width is doubled. Thus, in the condition that the length L of the channel of the driving TFT is constant, by increasing the quantity of the driving TFTs of the main area 10, the driving current of the main area 10 can be significantly increased, thereby increasing the voltage of the main area 10, achieving the 8-domain structure of the pixel structure. Meanwhile, there is no need to provide an additional step-down capacitor as in the prior art.

Further, in other embodiments, the quantity of the driving TFTs connected to the main area 10 is not particularly limited to only one greater than the quantity of the driving TFTs connected to the sub-area 20. Also, the quantity of the driving TFTs connected to the main area 10 is not limited to two, and the quantity of the driving TFT connected to the sub-area is not limited to one. The quantity of the driving TFTs connected to the main area 10 and the quantity of the driving TFTs connected to the sub-area 20 may be determined according to specific needs, and are not particularly limited.

For example, 3, 4, 5, or more driving TFTs can be connected to the main area 10, and 2, 3, 4, or more driving TFTs can be connected to the sub-area. In addition, the quantity of the driving TFTs connected to the main area 10 may also be two, three, or more greater than the quantity of the driving TFTs connected to the sub-area 20.

Further, still another aspect of the present invention provides a display panel including a substrate. The pixel according to the present invention is disposed on the substrate.

The present invention relates to a pixel structure and a display panel thereof, wherein the pixel structure adopts a novel driving TFT arrangement for the main area and the sub-area, which specifically sets a quantity of the driving TFTs connected to the main area being greater than a quantity of the driving TFTs connected to the sub-area, so that a voltage obtained by the main area is greater than a voltage of the sub-area, and thus, a step-down capacitor that must be disposed to reduce the voltage of the sub-area due to the identical voltage of the main area and the sub-area in the prior art is no longer needed. Accordingly, the structure of the pixel is simplified, and because an additional step-down capacitor is not necessary in the pixel structure, the aperture ratio of the pixel structure is increased, thereby reducing the risk that the pixel structure becomes a bright spot.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A pixel structure, comprising a main area and a sub-area, each provided with four domains, wherein the main area is located over the sub-area, the main area and the sub-area are respectively connected with driving thin-film transistors (TFTs) for current charging, all the driving TFTs are adjacent to each other in equal driving channel lengths and arranged in parallel with each other, and each of the driving thin-film transistors (TFTs) connected to the main area and the sub-area is arranged on a side of the main area away from the sub-area;

wherein a quantity of the driving thin-film transistors (TFTs) connected to the main area is greater than a quantity of the driving TFTs connected to the sub-area, such that a voltage of the main area is greater than a voltage of the sub-area.

2. The pixel structure according to claim 1, wherein the quantity of the driving TFTs connected to the main area is at least one greater than the quantity of the driving TFTs connected to the sub-area.

3. The pixel structure according to claim 1, wherein the main area is connected to two of the driving TFTs.

4. The pixel structure according to claim 1, wherein the driving TFTs connected to the main area are adjacent to each other and arranged in parallel with each other.

5. The pixel structure according to claim 1, wherein the driving TFTs connected to the main area and the driving TFTs connected to the sub-area are arranged in parallel with each other.

6. The pixel structure according to claim 5, wherein the driving TFTs connected to the main area and the driving TFTs connected to the sub-area are arranged vertically in parallel with each other.

7. The pixel structure according to claim 1, wherein the sub-area is connected to one driving TFT.

8. The pixel structure according to claim 1, wherein the driving TFTs connected to the main area are vertically disposed.

9. The pixel structure according to claim 1, wherein the driving TFTs connected to the sub-area are vertically disposed.

10. A display panel, comprising a substrate, wherein the substrate is provided with the pixel structure according to claim 1.

\* \* \* \* \*